United States Patent
Vidwans et al.

(10) Patent No.: US 10,133,744 B2
(45) Date of Patent: *Nov. 20, 2018

(54) COMPOSITE EXECUTION OF RENAME OPERATIONS IN WIDE AREA FILE SYSTEMS

(71) Applicant: SYMANTEC CORPORATION, Mountain View, CA (US)

(72) Inventors: Hrishikesh A. Vidwans, Piscataway, NJ (US); Suresh Gopalakrishnan, East Windsor, NJ (US); Shirish H. Phatak, Somerset, NJ (US)

(73) Assignee: SYMANTEC CORPORATION, Mountain View, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 14/835,016

(22) Filed: Aug. 25, 2015

(65) Prior Publication Data

US 2016/0055167 A1    Feb. 25, 2016

Related U.S. Application Data

(63) Continuation of application No. 12/047,567, filed on Mar. 13, 2008, now Pat. No. 9,135,284.

(51) Int. Cl.
*G06F 17/30* (2006.01)
*H04L 29/08* (2006.01)

(52) U.S. Cl.
CPC .. *G06F 17/30117* (2013.01); *G06F 17/30123* (2013.01); *G06F 17/30203* (2013.01);
(Continued)

(58) Field of Classification Search
CPC ......... G06F 17/30091; G06F 17/30085; G06F 17/30067; G06F 17/30117; G06F 17/3023; G06F 17/30123
(Continued)

(56) References Cited

U.S. PATENT DOCUMENTS 4,875,159 A    10/1989 Cary et al.
5,452,447 A     9/1995 Nelson et al.
(Continued)

OTHER PUBLICATIONS

Carey, M.J., M.J. Franklin, M. Livny and E.J. Shekita, "Data Caching Tradeoff's in Client-Server DBMS Architectures," Proceedings of the 1991 ACM SIGMOD International Conference on Management Data, Feb. 1991, pp. 357-366.
(Continued)

*Primary Examiner* — Michelle N Owyang
(74) *Attorney, Agent, or Firm* — Maschoff Brennan

(57) ABSTRACT

Methods, apparatuses, and systems directed to improving shared file access in wide area network file systems. In a particular implementation, one or more elements of a wide area file system cooperate to keep an original file intact on a remote file server until a new copy of the same file is completely flushed to the remote file server. In a particular implementation, rename operations identifying a source and a target in connection with application-level save operations are executed as two composite operations including creation of the target, and a delayed deletion of the source. The delay after which the source is deleted can be configured to be just large enough so that the application save operation on a local cache can be completed.

21 Claims, 7 Drawing Sheets

(52) U.S. Cl.
CPC .. *G06F 17/30309* (2013.01); *G06F 17/30371* (2013.01); *H04L 67/1097* (2013.01)
(58) Field of Classification Search
USPC .................................................. 707/600–899
See application file for complete search history.

(56) References Cited

U.S. PATENT DOCUMENTS

| | | | |
|---|---|---|---|
| 5,594,863 | A | 1/1997 | Stiles |
| 5,611,049 | A | 3/1997 | Pitts |
| 5,634,122 | A | 5/1997 | Loucks et al. |
| 5,689,706 | A | 11/1997 | Rao et al. |
| 5,706,435 | A | 1/1998 | Barbara et al. |
| 5,717,897 | A | 2/1998 | McCrory |
| 5,740,370 | A | 4/1998 | Battersby et al. |
| 5,805,809 | A | 9/1998 | Singh et al. |
| 5,864,837 | A | 1/1999 | Maimone |
| 5,878,218 | A | 3/1999 | Maddalozzo et al. |
| 5,881,229 | A | 3/1999 | Singh et al. |
| 6,012,085 | A | 1/2000 | Yohe et al. |
| 6,049,874 | A | 4/2000 | McClain et al. |
| 6,119,151 | A | 9/2000 | Cantrell et al. |
| 6,122,629 | A | 9/2000 | Walker et al. |
| 6,243,760 | B1 | 6/2001 | Armbruster et al. |
| 6,366,952 | B2 | 4/2002 | Pitts |
| 6,397,307 | B2 | 5/2002 | Ohran |
| 6,453,404 | B1 | 9/2002 | Bereznyi et al. |
| 6,505,241 | B2 | 1/2003 | Pitts |
| 6,507,866 | B1* | 1/2003 | Barchi ................. G06Q 10/107 709/207 |
| 6,587,921 | B2 | 7/2003 | Chiu et al. |
| 6,597,956 | B1 | 7/2003 | Aziz et al. |
| 6,609,183 | B2 | 8/2003 | Ohran |
| 6,757,705 | B1 | 6/2004 | Pardikar et al. |
| 6,944,676 | B1 | 9/2005 | Armbruster et al. |
| 7,003,721 | B1 | 2/2006 | Ramaley et al. |
| 7,113,962 | B1 | 9/2006 | Kee et al. |
| 7,546,353 | B2 | 6/2009 | Hesselink et al. |
| 7,657,517 | B2 | 2/2010 | Brown et al. |
| 2001/0011300 | A1 | 8/2001 | Pitts |
| 2001/0016896 | A1 | 8/2001 | Pitts |
| 2001/0047482 | A1 | 11/2001 | Harris et al. |
| 2001/0052058 | A1 | 12/2001 | Ohran |
| 2002/0083111 | A1 | 6/2002 | Row et al. |
| 2002/0144068 | A1 | 10/2002 | Ohran |
| 2003/0009538 | A1* | 1/2003 | Shah ................... H04L 63/0281 709/219 |
| 2004/0260768 | A1 | 12/2004 | Mizuno |
| 2005/0027746 | A1 | 2/2005 | Lin et al. |
| 2007/0208782 | A1* | 9/2007 | Carter ...................... G06F 8/65 |
| 2007/0260717 | A1 | 11/2007 | Kano |
| 2008/0091687 | A1* | 4/2008 | Watanabe ......... G06F 17/30017 |
| 2013/0031060 | A1* | 1/2013 | Lowery ............. G06F 17/30902 707/689 |

OTHER PUBLICATIONS

Cox, A.L., and R.J. Fowler, "Adaptive Cache Coherency for Detecting Migratory Shared Data," Proceedings of the 20th Annual International Symposium on Computer Architecture, 1993, pp. 98-108.

Cortes, T.S. Girona and J. Labarta, "Avoiding the Cache Coherence Problem in Parallel/Distributed File System," Proceedings of the High-Performance Computing and Networking Conference, Apr. 1997, pp. 860-869.

Cortes, T.S. Girona and J. Labarta, "Design Issues of a Cooperative Cache with no Coherence Problems," Proceedings of the 5th Workshop on I/O in Parallel and Distributed Systems, Nov. 17, 1997, pp. 37-46.

Wang, J., "A Survey of Web Caching Schemes for the Internet," ACM SIGCOMM Computer Communication Review, vol. 29, No. 5, Oct. 1999, pp. 36-46.

Wu, K-L and P.S. Yu, "Local Replication for Proxy Web Caches with Hash Routing," Proceedings of the CIKM '99, Nov. 1999, pp. 69-76.

Luo, Q., et al., "Middle-Tier Database Caching for e-Business," Proceedings of the ACM SIGMOD Conference, Jun. 4-6, 2002, pp. 600-611.

Gray, C.G. and D.R. Cheriton, "Leases: An Efficient Fault-Tolerant Mechanism for Distributed File Cache Consistency," Proceedings of the 12th ACM Symposium on Operating Systems Principles, pp. 202-210, Nov. 1989.

Satyanarayanan, M., et al., "Coda File System User and Administrators Manual," Carnegie Mellon University, Aug. 1997.

Braam, Braam, P.J. and P.A. Nelson, "Removing Bottlenecks in Distributed Filesystems: Coda and InterMezzo as Examples," Proceedings of the Linux Expo 1999, May 1999.

Braam, P.J., M. Callahan, and P. Schwan, "The InterMezzo File System," Proceedings of the Perl Conference 3, O'Reilly Open Source Convention, Aug. 1999.

Phatak, S.H. and B.R. Badrinath, "Data Partitioning for Disconnected Client Server Databases," Proceedings of the 1st ACM International Workshop on Data Engineering and Wireless Mobile Access, pp. 102-109, 1999.

Tierney, B.L. et al., "A Network-Aware Distributed Storage Cache for Data Intensive Environments," Proceedings of the 8th IEEE International Symposium on High Performance Distributed Computing, pp. 185-193, 1999.

Braam, P.J., "InterMezzo: File Synchronization with InterSync," Carnegie Mellon University, Mar. 20, 2002.

Tacit Networks, Inc. ("Tacit Networks Delivers LAN-Speed Access to Data Over WAN"), press release, Dec. 9, 2002.

Satyanarayanan, M., "Coda: A Highly Available File System for a Distributed Workstation Environment (#13)," Proceedings of the Second IEEE Workshop on Workstation Operating Systems, Pacific Grove, CA, Sep. 1989.

Braam, P.J., "The Coda Distributed File System (#74)," Linux Journal, No. 50, Jun. 1998.

Tridgell, Andrew, "Efficient Algorithms for Sorting and Synchronization," A thesis submitted for the degree of Doctor of Philosophy at the Australian National University, Feb. 1999.

Dorairajan, Vinodh, "Enabling File Sharing Over the WAN," CommsDesign, May 24, 2004.

* cited by examiner

COMPOSITE EXECUTION OF RENAME OPERATIONS IN WIDE AREA FILE SYSTEMS

RELATED APPLICATION

This application is a continuation of U.S. application Ser. No. 12/047,567 filed Mar. 13, 2008, entitled "Composite Execution of Rename Operations in Wide Area File Systems."

TECHNICAL FIELD

The present disclosure relates to wide area network file systems and file caching over distributed networks.

BACKGROUND

While workers can easily share gigabytes of project data on a local-area network (LAN) using standard file-server technology, such is not the case with workers in remote offices connected over wide-area networks (WANs). With respect to file sharing over WANs, standard file server protocols provide unacceptably slow response times when opening and writing files.

All major file-sharing protocols were designed for LAN environments where clients and servers are located in the same building or campus, including: NFS (Network File System, used for Unix/Linux environments), CIFS (Common Internet File System used for Windows environments), and IPX/SPX (Internetwork Packet Exchange/Sequenced Packet Exchange, used for Novell environments). The assumption that the client and the server would be in close proximity led to a number of design decisions that do not scale across WANs. For example, these file sharing protocols tend to be rather "chatty", insofar as they send many remote procedure calls (RPCs) across the network to perform operations.

For certain operations on a file system using the NFS protocol (such as an rsync of a source code tree), almost 80% of the RPCs sent across the network can be access RPCs, while the actual read and write RPCs typically comprise only 8-10% of the RPCs. Thus 80% of the work done by the protocol is simply spent trying to determine if the NFS client has the proper permissions to access a particular file on the NFS server, rather than actually moving data. In a LAN environment, these RPCs do not degrade performance significantly given the usual abundance of bandwidth, but they do in WANs, because of their high latency. Furthermore, because data movement RPCs make up such a small percentage of the communications, increasing network bandwidth will not help to alleviate the performance problem in WANs.

Therefore, systems have been developed (called wide area file services (WAFS)) which combine distributed file systems with caching technology to allow real-time, read-write access to shared file storage from any location, including locations connected across WANs, while also providing interoperability with standard file sharing protocols such as NFS and CIFS.

WAFS systems typically include edge file gateway (EFG) appliances (or servers), which are placed at multiple remote offices, and one or more file server appliances, at a central office or remote data center relative to the EFG appliance, that allow storage resources to be accessed by the EFG appliances. Each EFG appliance appears as a local fileserver to office users at the respective remote offices. Together, the EFG appliances and file server appliance implement a distributed file system and communicate using a WAN-optimized protocol. This protocol is translated back and forth to NFS and CIFS at either end, to communicate with the user applications and the remote storage.

The WAN-optimized protocol typically may include file-aware differencing technology, data compression, streaming, and other technologies designed to enhance performance and efficiency in moving data across the WAN. File-aware differencing technology detects which parts of a file have changed and only moves those parts across the WAN. Furthermore, if pieces of a file have been rearranged, only offset information will be sent, rather than the data itself.

In WAFS systems, performance during "read" operations is usually governed by the ability of the EFG appliance to cache files and the ability to serve cached data to users while minimizing the overhead of expensive kernel-user communication and context switches, in effect enabling the cache to act just like a high-performance file server. Typically, the cache attempts to mirror the remote data center, so that "read" requests will be satisfied from the local cache with only a few WAN round trips required to check credentials and availability of file updates.

Many software applications, such as word processing or spreadsheet applications, handle file save and close operations for documents in a common manner. In particular, many software applications never overwrite the original files that are being edited. Instead they rename the original file as a backup copy and create a new file for the document that is being created. For example, when a user opens a given file (here, A.doc) using a word processing application, a series of operations may result. The word processing application may first create a temporary file, such as ~$xxx.doc, where xxx is based on the file name. After a user edits and saves the file, a new temporary file (e.g., ~WRDxxx.tmp, where xxx is a random value) is created. The application writes the new contents of the file to this newly created temporary file, renames the original file (e.g., A.doc) to another temporary file name type (e.g., WRLyyy.tmp, where yyy is another random value), and renames the temporary file with the updated data (e.g., WRDxxx.tmp) to the original file name (A.doc). The second temporary file containing the previous version of the file is also deleted.

As discussed above, in a WAFS system, an edge and core appliance is disposed between a client hosting the software application and the file server that hosts the data file. The operation of the WAFS system changes the manner in which the file operations are executed. For example, the file system operations discussed above are performed on a version of the file cached at the edge appliance. In some WAFS systems, the edge appliance passes meta data operations (rename, delete, create, etc.), but not the actual data, through to the core appliance, which performs operations on the remote file server. As a result, temporary files with no data are created on the remote file server. For example, in the example discussed above, a save operation would create a WRDxxx.tmp file on the remote file server with zero bytes. In addition, the subsequent rename operation that also passes through to the core appliance therefore causes A.doc, while open at the remote client, to appear as a file with no data on the remote file server.

While the condition is not a concern for remote users at network locations served by the edge appliance, it is a concern for other users who during this time are not able to access the contents of the file. Furthermore, this condition results in certain inefficiencies during a file flush operation. When the file flush occurs there is no data in the A.doc on the remote file server with which to leverage differencing algorithms to reduce the amount of data transmitted to the core appliance.

SUMMARY

In particular embodiments, the present invention provides methods, apparatuses, and systems directed to improving shared file access in wide area network file systems. In a particular implementation, one or more elements of a wide area file system cooperate to keep an original file intact on a remote file server until a new copy of the same file is completely flushed to the remote file server. In a particular implementation, rename operations identifying a source and a target in connection with application-level save operations are executed as two composite operations including creation of the target, and a delayed deletion of the source. The delay after which the source can be configured to be just large enough so that the application save operation on a local cache can be completed. Implementations of the present invention can be configured to improve the performance of wide area network file systems, while preserving file consistency.

DESCRIPTION OF THE DRAWINGS

Example embodiments are illustrated in referenced figures of the drawings. It is intended that the embodiments and figures disclosed herein are to be considered illustrative rather than limiting.

DESCRIPTION OF EXAMPLE EMBODIMENT(S)

The following example embodiments are described and illustrated in conjunction with apparatuses, methods, and systems which are meant to be examples and illustrative, not limiting in scope. As will be apparent from the description below, embodiments of the present invention facilitate shared access to files in a distributed file caching system, such as a wide area network file system, by keeping an original file intact on a remote file server until a new copy of the file is completely flushed to the remote file server.

A. Network Environment

Figure 1A:
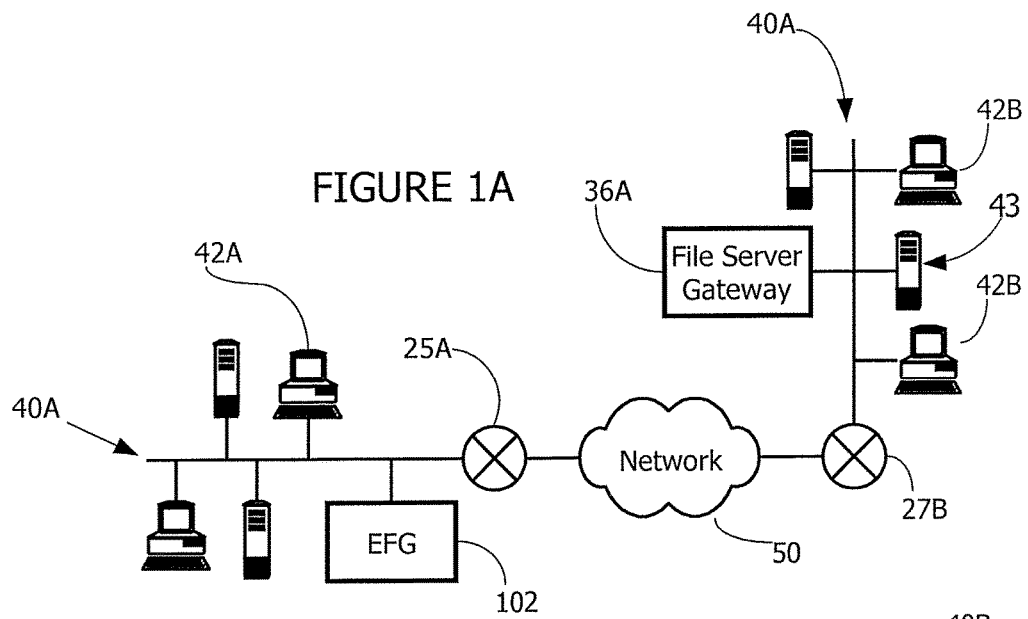
FIGS. 1A-1B are high-level block diagrams illustrating example computer network environments in which embodiments of the present invention might operate.
Figure 1B:
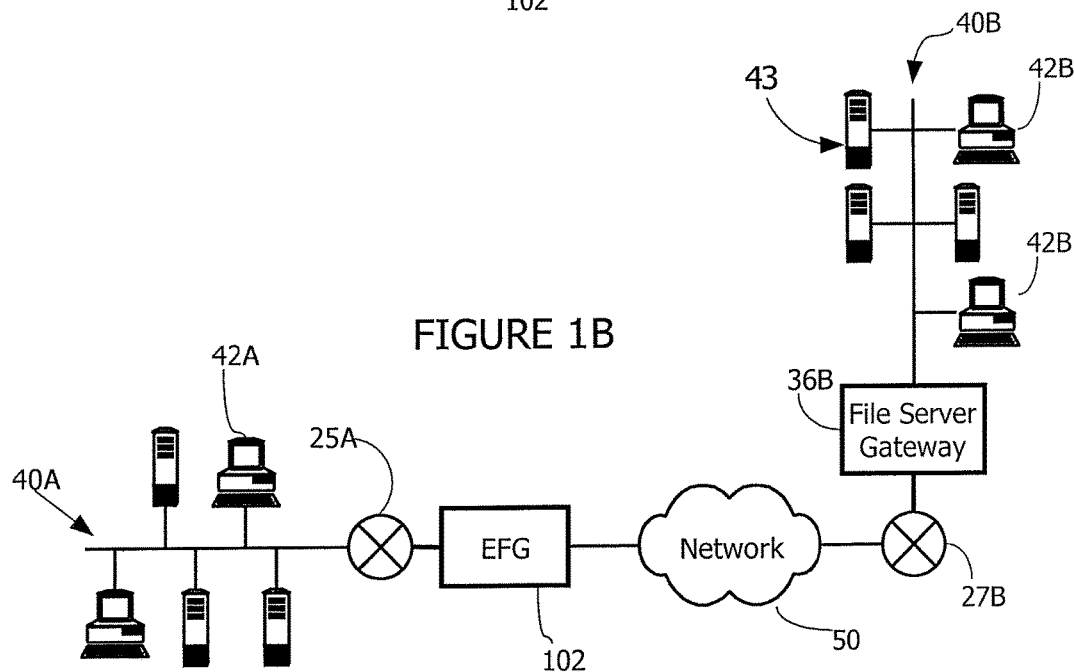

As discussed in the background above, WAFS systems often include one or more EFG appliances 102 (or servers) and one or more remote file server appliances 36 (or servers), typically at a different location, that allow storage resources to be accessed by the EFG appliances 102 on behalf of workstations 42A. FIGS. 1A-1B show at a high level such an arrangement, which might be used with an embodiment of the present invention. In particular, FIGS. 1A-1B show a network 50 connecting a remote file server appliance 36 to EFG appliance 102. In turn, the remote file server appliance 36 is connected, via a LAN (40A, 40B) or other network, to a file server 43 and the EFG appliances 102 are connected, again via a LAN 40A or other network, to workstations 42A. It can be appreciated that EFG appliances 102 may also be remote file server appliances with respect to data stored on resources operably connected to the same LAN or subnet.

In the embodiment of FIG. 1A, a router 25A is interposed between the LAN 40A and the network 50 which is in turn connected to router 27B and LAN 40B. In the embodiment of FIG. 1B, EFG appliance 102 is interposed between router 27B and the network 50. In a similar fashion, router 27B is deployed between the network 50 and the file server appliance 36B.

Figure 2:
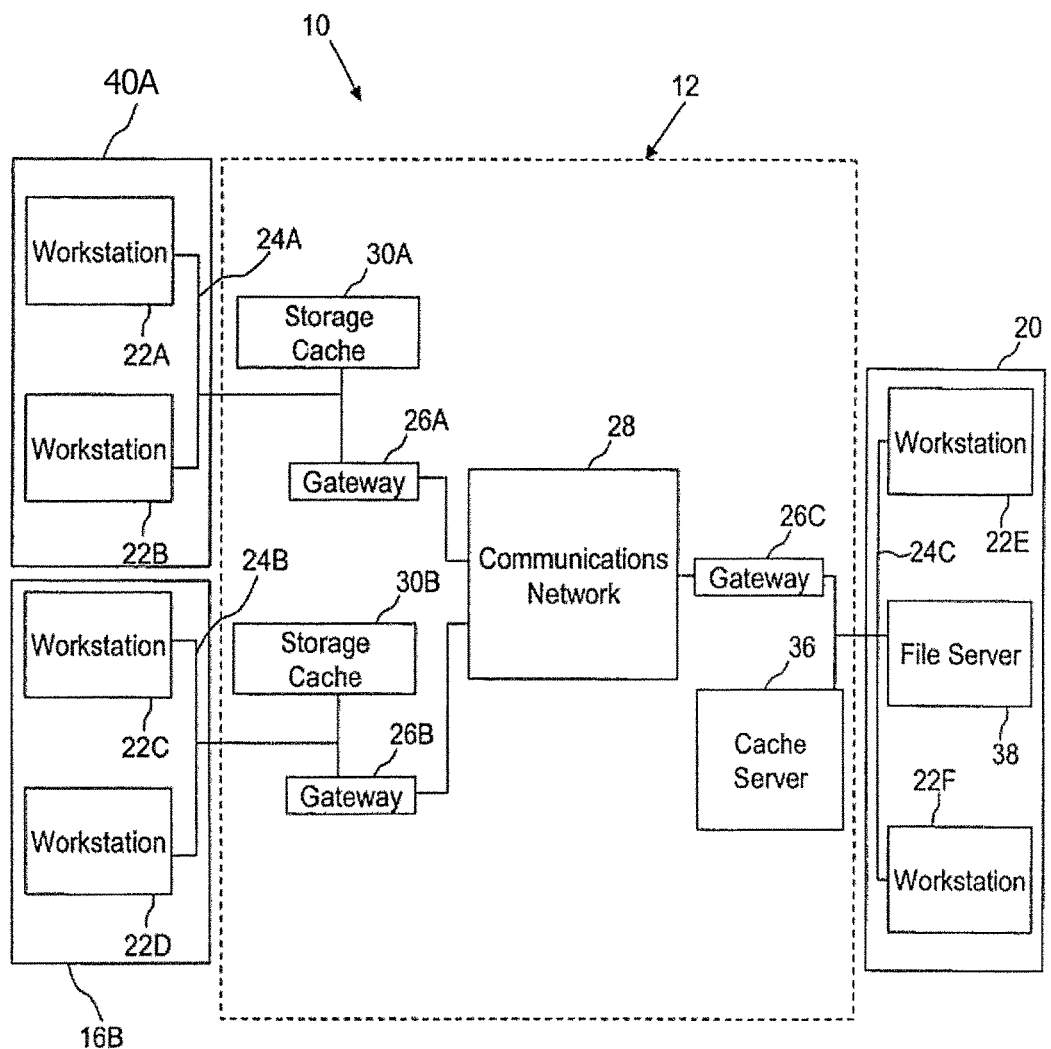
FIG. 2 is a lower-level block diagram illustrating an example computer network environment in which embodiments of the present invention might operate.

FIG. 2 is a block diagram showing, at a lower level, an example computer network environment in which embodiments of the present invention might operate. The network environment 10 includes a storage-caching protocol system 12 that interfaces with a distributed file system application operating at a data center computer system, which is a repository for data files, and a computer system which is associated with a computer workstation that desires to access, i.e., view only (read) or modify (write), data files stored at a file server of a data center system. The data center system is typically at a remote location relative to the computer system. The storage-caching protocol system 12 includes at least one EFG appliance 30A, 30B (here referred to as a "storage cache"), which is coupled to a workstation of an associated remote system, and at least one remote file server appliance 36 (here referred to as a "cache server"), which is coupled to a file server of a data center system, where the storage cache and the cache server utilize a communications link, such as a link established over the Internet, to transfer (i) copies of data files that the associated workstation desires to access, (ii) file update data representative of on any data file modifications entered by authorized workstations that access the data file, and (iii) data associated with the operating features of the storage caching protocol system 12.

Storage caching protocol system 12 in the illustrative network 10 shown in FIG. 2, the system 12 interfaces with work group computer systems 16A and 16B and a central work group data center computer system 20. The system 16A includes computer workstations 22A and 22B interconnected over a communications channel 24A, such as an Ethernet or like medium. Similarly, the system 16B includes computer workstations 22C and 22D interconnected over a communications channel 24B. Each of the workstations 22 is part of or constitutes, for example, a personal computer, a personal digital assistant, or other like electronic device including a processor and memory and having communications capabilities. In addition, the workstations of a system, in combination with the Ethernet, form a LAN and operate in accordance with a conventional distributed file system, such as NFS or CIFS, which provides that a user of a workstation can access data files located remotely from the system in which the workstation is contained.

A communications gateway 26A, 26B, 26C couples the Ethernet 24 of each of the systems 16 to a communications network 28. The network 28, for example, can be a WAN, LAN, the Internet or any like means for providing data communications links between geographically disparate locations. The gateway 26, for example, may implement a VPN Internet connection with remote gateways. The gateway 26 enables data, such as data files accessible in accordance with a distributed file system such as NFS or CIFS, to be transferred between a workstation and a remotely located file server. Furthermore, the functions of gateway 26 may be physically hosted on the same computing device as the storage cache and cache servers.

Referring again to FIG. 2, the storage caching system 12 includes storage caches (EFG appliances) 30A and 30B which are associated with the systems 16A and 16B, respectively. Each storage cache 30 is coupled to the Ethernet 24 and the gateway 26A, 26B of the associated system 16A, 16B. In addition, the storage caching system 12 includes a cache server 36. The cache server 36 is coupled to an associated gateway 26C which is also coupled to the network 28. An Ethernet 24C couples the gateway 26C and the cache server 36 to a file server 38 and workstations 22D and 22E contained in the data center system 20. The file server 38 is a file storage device, such as a NAS (Network Attached Storage), which is a repository for data files and provides for distribution of stored data files to authorized workstations in accordance with the operation of distributed file systems, such as NFS or CIFS, which are implemented at the authorized workstations of the systems 16 and the data center 20. For purposes of illustration, it is assumed that all of the workstations 22 in the systems 16 and in the data center 20 constitute authorized workstations and operate in accordance with a distributed file system compatible with that of the server 38.

Figure 3:
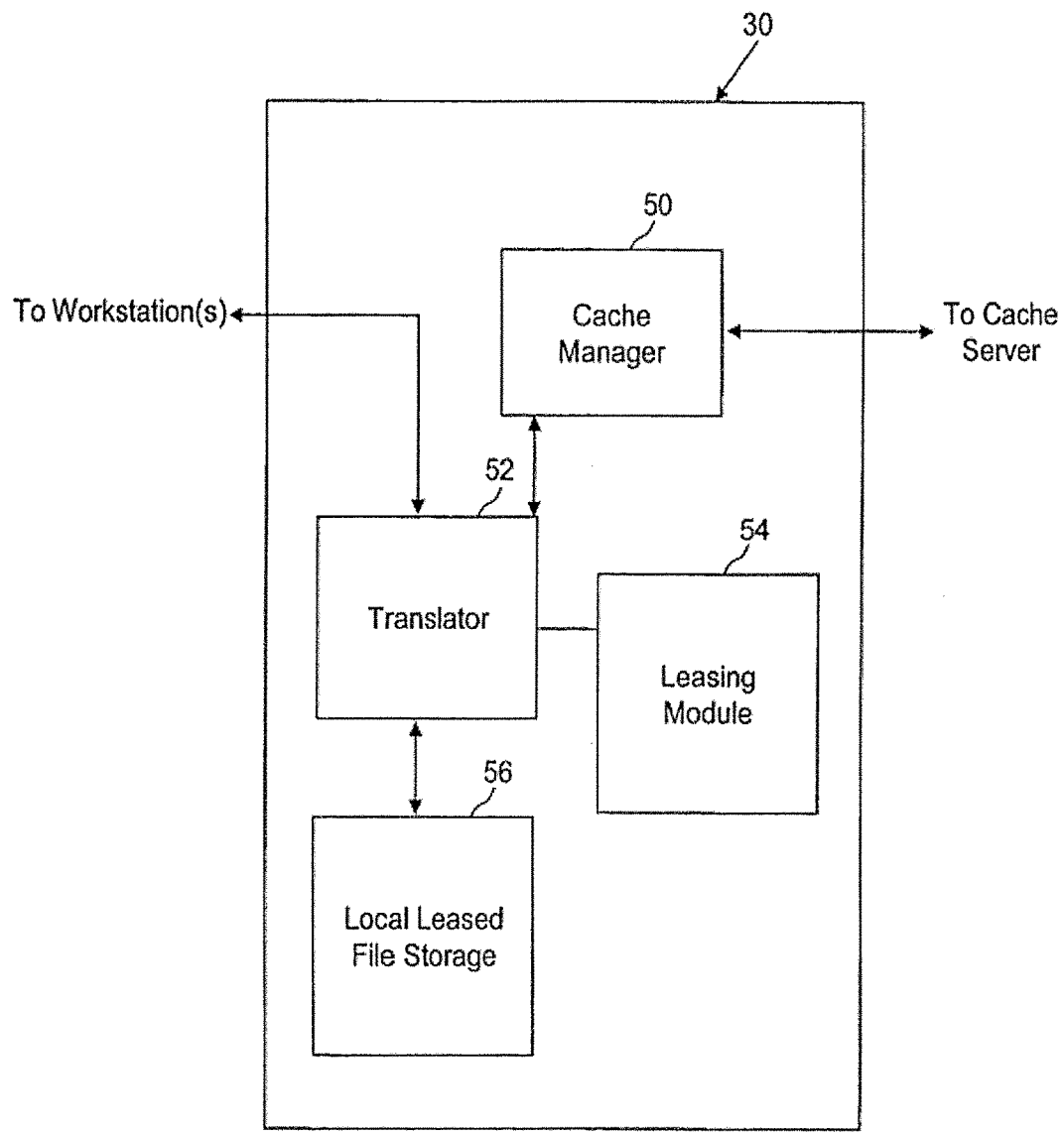
FIG. 3 is a block diagram illustrating the functional components of an EFG appliance (or server), which might be used in some embodiments of the present invention.

FIG. 3 is a block diagram of a storage cache (or EFG appliance), in accordance with the present invention. Referring to FIG. 3, the storage cache 30 includes the modules of a cache manager 50, a translator 52, a leasing module 54, and a local leased file storage 56. The cache manager 50 is coupled to the translator 52 and is coupled to a cache server, such as the cache server 36 as shown in FIG. 2, via gateways and a communications network. The translator 52 is coupled to the leasing module 54 and the local storage 56, and is coupled to workstations of an associated system via an Ethernet connection.

The cache manager 50 controls routing of data files, file update data, and data file leasing information to and from the cache server 36. The translator 52 stores copies of accessed data files at the storage 56 as a cached data file, makes the cached data file available for reading or writing purposes to an associated workstation that requested access to a data file corresponding to the cached data file, and updates the cached data file based on data file modifications entered by the workstation or update data supplied from the cache server. In addition, the translator 52 can generate a checksum representative of a first data file and determine the difference between another data file and the first data file based on the checksum using techniques that are well known. The leasing module 54, through interactions with the cache server 36, determines whether to grant a request for access to a data file from an associated workstation, where the access request requires that the cached data file is made available to the associated workstation either for read or write purposes. Typically, a storage cache is associated with every remote computer system that can access a data file stored at a file server of a data center system over the network 28.

Figure 4:
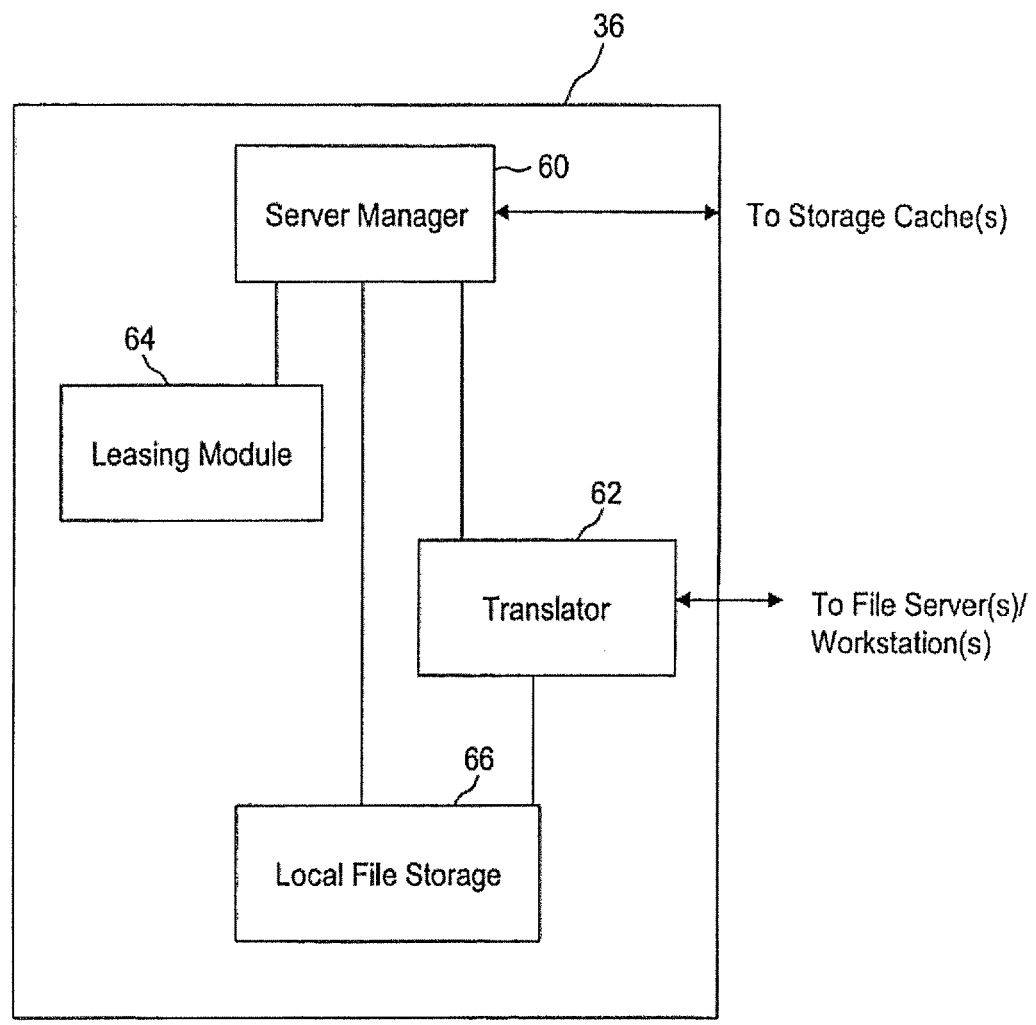
FIG. 4 is a block diagram illustrating the functional components of a CS appliance (or server).

FIG. 4 is a block diagram of the cache server (or CS appliance). The cache server manages shared access to data files stored in the file server by multiple storage caches, such as the caches 30A and 30B, and also by workstations, such as the workstations 22E and 22F of the data center 20, which are not associated with a storage cache. In some implementations, the cache server might be a thin appliance having an architecture that makes it compatible and easily integrated with a distributed file system, such as NAS and SAN (Storage Area Network), implemented at a computer system and a data center computer system.

Referring to FIG. 4, the cache server 36 includes the modules of a server manager 60, a translator 62, a leasing module 64, and a local file storage 66. The server manager 60 is coupled to the translator 62, the leasing module 64 and the storage 66 and also is coupled to storage caches, such as the storage caches 30A and 30B, via the gateway 26C and the network 28. The translator 62 is coupled to the storage 66 and is coupled to a file server of an associated data center computer system via an Ethernet connection. The translator 62 temporarily stores, at the storage 66, copies of data files stored at and obtained from the file server 38, and performs processing using the stored data files and update data received from a storage cache to generate a replacement, updated data file. The translator 62 also replaces a data file stored in the file server 38 with the replacement data file. In addition, the translator 62 can supply to a workstation associated with the central system, such as the workstations 22D and 22E, a copy of a data file stored at the file server 38 only for viewing purposes in accordance with the leasing protocol.

The translator 62, like the translator 52, can generate a checksum representative of a first data file and determine the difference between another data file and the first data file using the checksum. In addition, the leasing module 64, through interactions with the storage caches included in the system 12, determines whether a request for access to a data file from a workstation associated with a specific storage cache should be granted or denied.

It is to be understood that each of the modules of each of the storage caches 30 and the cache server 36, which perform data processing operations, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in some embodiments, the modules within each of the cache server 36 and the storage caches 30 can be combined, as suitable, into composite modules, and that the cache server and storage caches can be combined into a single appliance which can provide both caching for a workstation and real time updating of the data files stored at a file server of a central data center computer system.

The storage caches and the cache server, of the storage caching system 12 provide that a data file stored in a file server of a data center, and available for distribution to authorized workstations via a distributed file system, can be accessed for read or write purposes by the workstations, that the workstations experience reduced latency when accessing the file, and that the cached data file supplied to a workstation in response to an access request corresponds to a real time version of the data file. A storage cache of the system 12 stores in the storage 56 only a current version of the cached data file corresponding to the data file that was the subject of an access request, where the single cached data file incorporates all of the data file modifications entered by a workstation associated with the storage cache while the file was accessed by the workstation.

In a connected mode, file update data associated with the cached data file is automatically, and preferably at predetermined intervals, generated and then transmitted (flushed) to the cache server. Most preferably, the file update data is flushed with sufficient frequency to provide that a real time, updated version of the data file is stored at the file server and can be used by the cache server to respond to an access request from another storage cache or a workstation not associated with a storage cache. In some implementations, the local storage 56 of the storage cache includes only cached data files corresponding to recently accessed data files.

B. System Architecture for EFG Appliance and Cache Server

Figure 5:
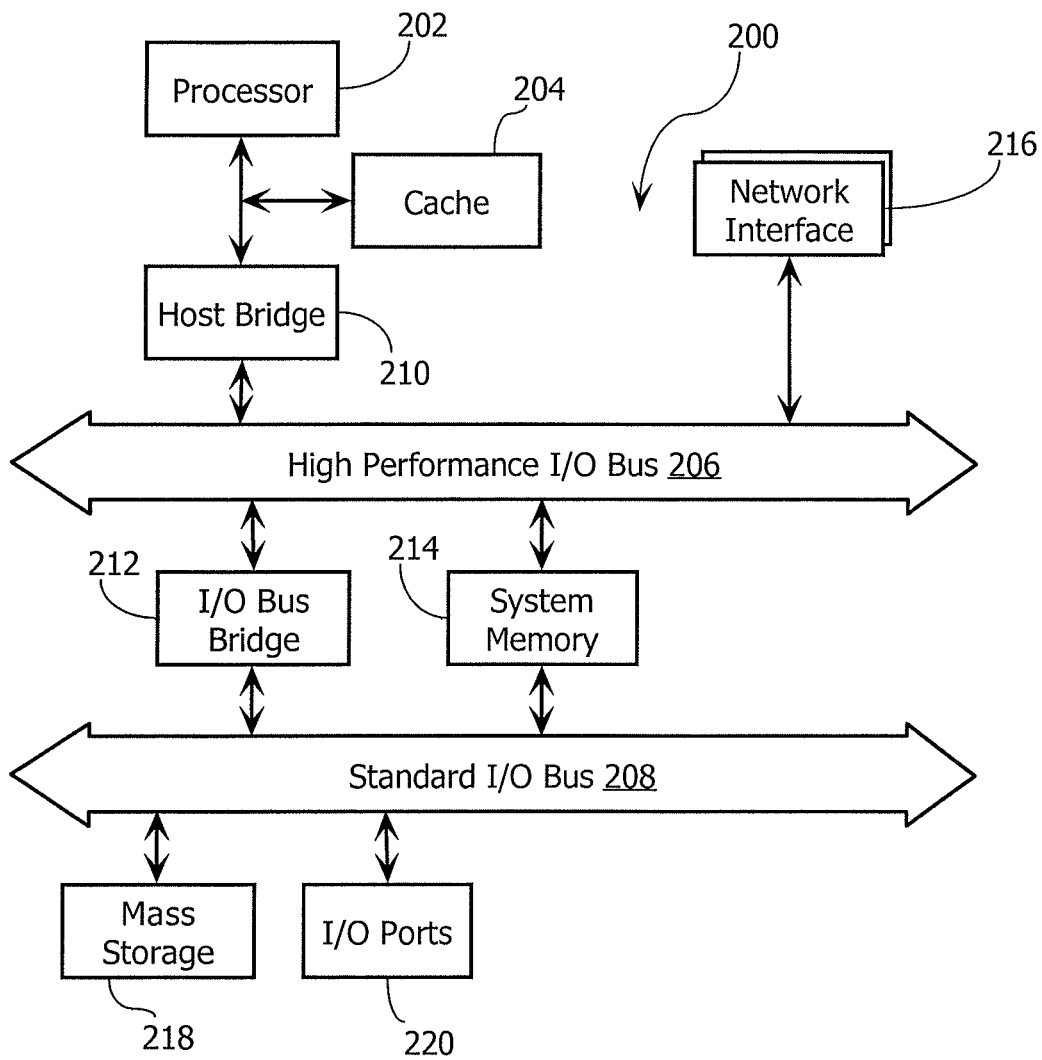
FIG. 5 is a diagram showing a high-level example system architecture that may be used to implement an EFG appliance (or server) or a CS appliance (or server).

FIG. 5 illustrates, for didactic purposes, a hardware system 200, which might be a part of an EFG appliance (or storage cache) or a remote file server appliance (or cache server), in particular embodiments. Typically, an appliance includes an off-the-shelf computer and operating system, but the appliance vendor has designed the computer's box and user interface so that the user cannot access anything on the computer, except for an application interface. Since the underlying computing architecture is locked down and essentially invisible, it becomes difficult to discern that the device really functions on top of general purpose hardware and operating system software. Linux is commonly used as the operating system for such appliances, though other operating systems, such as Windows-based operating systems, are also used. Alternatively, as suggested elsewhere, some embodiments employ an EFG server rather than an EFG appliance and in those embodiments the underlying computer architecture is not locked down. The same is also true of embodiments that employ a CS server, rather than a CS appliance.

In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® Server 2003 (or other variant) operating system available from Microsoft Corporation of Redmond, Wash. However, the present invention may be used with other suitable operating systems, such as the Windows® 95/98/NT/XP/Vista operating system, available from Microsoft Corporation of Redmond, Wash., the Linux operating system, the Apple Macintosh Operating System, available from Apple Computer Inc. of Cupertino, Calif., UNIX operating systems, and the like.

C. File Flush and Delayed, Composite Rename Operations

In a particular implementation, the EFG appliances 102 and remote file server appliances 36 implement a rename-based rsync mechanism to synchronize data upon file flushes. Rsync is a software application which synchronizes files and directories from one location to another while minimizing data transfer using delta encoding when appropriate. In a particular implementation, the rename based rsync mechanism uses the original file as the basis to construct differences with the file on the EFG appliance 102. During a flush, a temporary file is created and, using the original file data and the differencing instructions provided by the EFG appliance 102, the current version of the data file is constructed as the temporary file. After the current version is completed, the temporary file is renamed to the original file name. Unlike so-called rsync_in_place models, the original file remains intact until the rename operation is performed. As a result of this the basis file for the rsync or other synchronization functionality will be preserved until the very end when the temporary file that is built is renamed to the original file name.

The File Flush mechanism set forth above is not, by itself, sufficient to preserve the consistent state of the file on the remote file server 43. There are some sequences of operations that still cause the original file to appear inconsistent. This behavior differs across applications but overall follows the same basic pattern. This happens every time an application saves a file. This file inconsistency is present even when you go over a CIFS share directly to the datacenter file server. However the time duration in the above case is much less (in the order of a few seconds depending on the file size) and hence either user invisible or goes unnoticed.

The following table 1 illustrates the sequence of operations and file states that can occur, and the roles of the EFG 102 and cache server 36, in connection with a save operation associated with a word processing application, such as Microsoft® Word®.

TABLE 1

Save Operation without Optimization

| Operation | EFG 102 | Cache Server 36 |
|---|---|---|
| Create wrd.tmp | a.doc, wrd.tmp | a.doc, wrd.tmp<br>wrd.tmp is 0 byte |
| Write new contents to wrd.tmp | a.doc, wrd.tmp<br>wrd.tmp has new data | a.doc, wrd.tmp<br>wrd.tmp is still 0 bytes |
| Rename a.doc to wrl.tmp | wrd.tmp, wrl.tmp | wrd.tmp, wrl.tmp;<br>wrd.tmp is still 0 bytes |
| Rename wrd.tmp to a.doc | a.doc, wrl.tmp | a.doc, wrl.tmp<br>a.doc is now 0 bytes! |
| Delete wrl.tmp | a.doc | a.doc<br>a.doc is 0 byte |
| Flush a.doc | a.doc | a.doc<br>a.doc grows from 0 byte |

In the foregoing, if the EFG 102 and the cache server 36 become disconnected during the flush operation, the target file name (here, a.doc) will only have a partial set of data. Accordingly, others trying to access the same file from other network locations will not be presented with a complete version of the file (whether it be a previous or current version).

As discussed below, the EFG 102 and cache server 36 include logic that, in some instances, splits rename operations associated with application-level file saves into composite operations and phases execution of the composite operations to ensure that an accessible version of a file remains on the remote file server 38. In a particular implementation, certain rename operations are converted into two operations eventually executed by the cache server 36 in connection with the remote file server 38. Namely, the rename operation is separated into a command or operation that creates a target file for the target of the rename operation, followed, after a delay, by the deletion of the source file identified in the rename operation. When the deletion of source file is delayed, it is stored in a Deleted Object List (DOL). A thread or process periodically processes this list and performs the file deletions on the remote file server 38.

Figure 6:
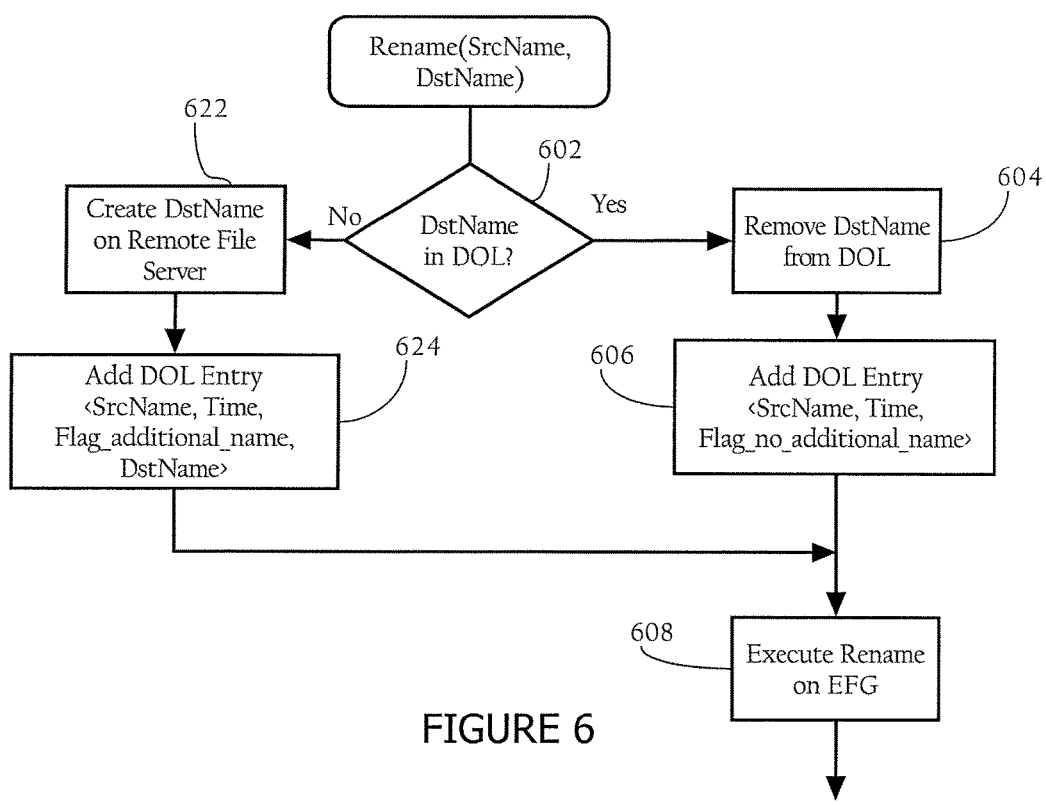
FIG. 6 is a flow chart illustrating a method for processing rename commands according to one possible implementation of the invention.

FIG. 6 is a flow chart illustrating a method for processing rename commands according to one possible implementation of the invention. In one implementation, the rename commands are issued by a client application and received at an EFG 102. Rename commands, as discussed above, may be issued in response to an explicit save command, or as a result of an auto-save operation. Rename commands can also be issued as a result of an explicit rename operation whereby a user desires to rename a file from one name to another. The process illustrated in FIG. 6 can be implemented at the EFG 102. In other implementations, one or more aspects of the functions (such as maintaining the DOL) disclosed in connection with FIG. 6 can be performed by the cache server 36.

As FIG. 6 illustrates, when EFG 102 receives a rename command identifying a source file name (SrcName) and a target file name (DstName), it accesses a Deleted Object List (DOL) to determine whether a DOL entry exists that identifies the target file name (DstName) (602). If so, the EFG 102 removes the DOL entry (604), and adds a DOL entry including the source file name, a time stamp associated with the current time, and a flag set to indicate that no additional file name exists (606). The time stamp can be an explicit time value (e.g., hh:mm:ss, etc.) or a counter value returned from a clock or counter source. The EFG 102 also performs the rename operation locally on its cache (608). If the DOL does not contain the target file name, the EFG 102 issues a command to cache server 36 causing it to create a file having the target file name on the remote file server 38 (622), and adds an entry to the DOL list (604). In one implementation, the DOL entry includes the source file name, a time stamp, a flag set to indicate the presence of an additional name, and the target file name. The EFG 102 also executes the rename operation on its local cache (608).

Figure 7:
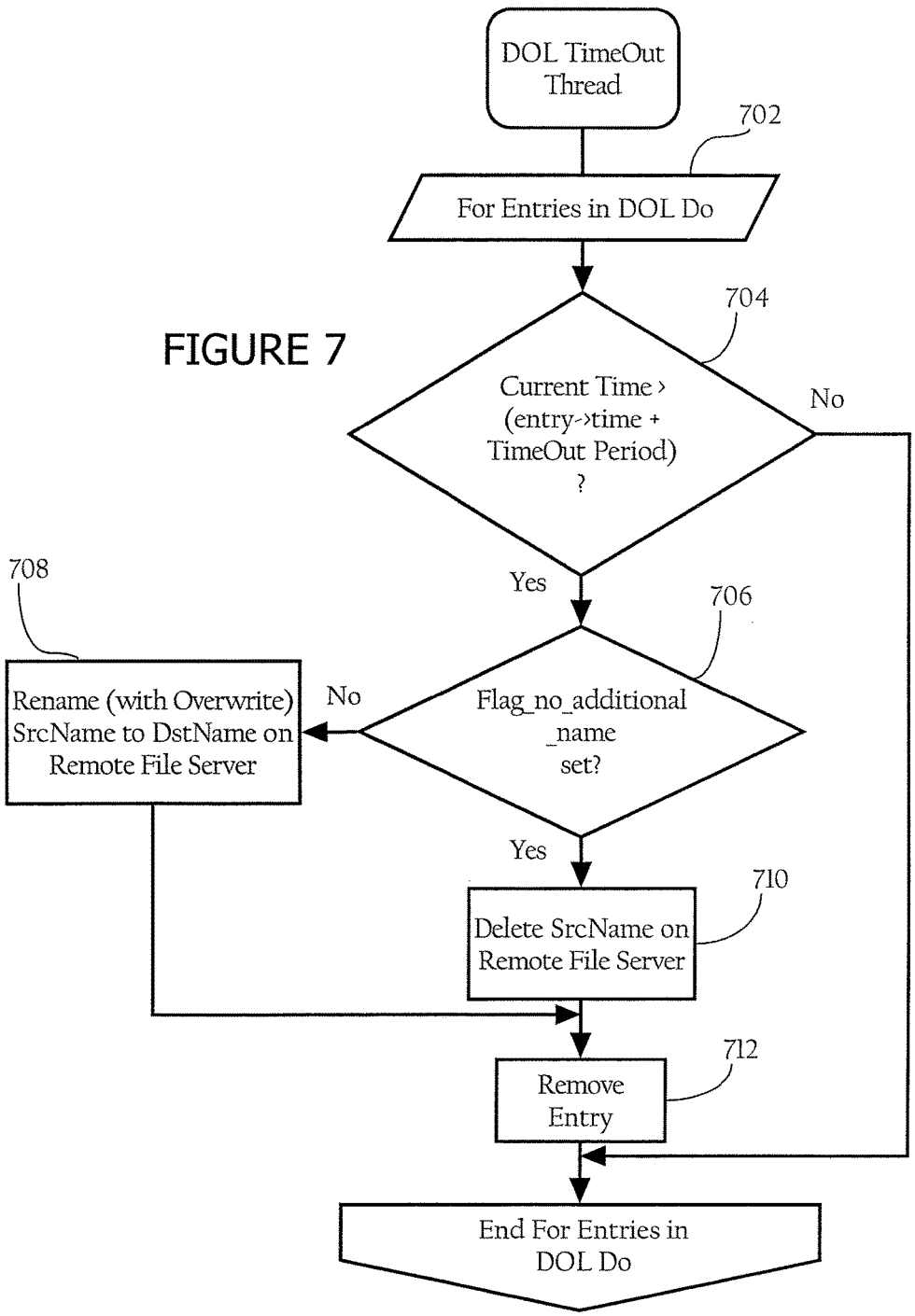
FIG. 7 is a flow chart providing a method for processing a deleted object list according to one possible implementation of the invention.

As discussed above, a separate DOL TimeOut thread or process hosted by the EFG 102 periodically runs through the DOL to delete file objects identified in the DOL. The DOL TimeOut thread can be run on a periodic basis, such as every one second. FIG. 7 illustrates operation of a DOL TimeOut process according to one possible implementation of the invention. The DOL TimeOut process, for each entry in the DOL (702), compares the current time or a clock counter value to the time stamp of an entry (704). If the current time is greater than the time stamp of the entry plus a time out period (e.g., 1 second or a incremental count value that corresponds to 1 second) (704), the DOL TimeOut process then access the flag of the entry (see above) to determine whether an additional file name has been indicated (706). If no additional file name is indicated, the DOL TimeOut process issues a command that causes the cache server 36 to delete the source file name identified in the DOL entry from the remote file server (710) and removes the DOL entry (712). Otherwise, the DOL TimeOut process issues a command that causes the cache server 36 to execute a rename operation that renames the source file with the target name, and overwrites the file previously identified with the target name on the remote file server 38.

Implementation of the processes illustrated in FIGS. 6 and 7 in response to rename requests issued by a client application ensures that the rename operation is completed on the EFG 102 before the source file on the remote file server 38 is changed. In this manner, connectivity between the EFG 102 and the cache server 36 will not interrupt access to some version of the source file on the remote file server 38 by other hosts. For example, the processes described above result in the following operations, and file states, associated with an application-level save command, as illustrated in Table 2.

TABLE 2

Save Command with Optimization

| Operation | EFG 102 | Cache Server 36 |
|---|---|---|
| Receive Cmd (Create wrd.tmp) | a.doc, wrd.tmp | a.doc, wrd.tmp wrd.tmp is 0 bytes |
| Receive Cmd (Write new contents to wrd.tmp) | a.doc, wrd.tmp wrd.tmp has new contents | a.doc, wrd.tmp wrd.tmp is still 0 bytes |
| Receive Cmd (Rename a.doc to wrl.tmp); Perform Rename on EFG; create wrl.tmp on file server, a.doc inserted in DOL | wrd.tmp wrl.tmp | a.doc, wrd.tmp, wrl.tmp wrd.tmp is still 0 bytes |
| Receive Cmd (Rename wrd.tmp to a.doc); Perform Rename on EFG; a.doc is removed from DOL, wrd.tmp goes to DOL | a.doc, wrl.tmp | a.doc, wrd.tmp, wrl.tmp a.doc is not 0 bytes! |
| Delete wrl.tmp on File Server | a.doc | a.doc, wrd.tmp a.doc is not 0 byte |
| Delayed delete from DOL for wrd.tmp on File Server | a.doc | a.doc a.doc is not 0 byte |
| Flush a.doc | a.doc | a.doc a.doc is flushed via rename based rsync |

As the foregoing demonstrates, the original version of the file (a.doc) is available even in the event of disconnection. Other implementations are also possible. The process illustrated in FIG. 6, for example, handles all rename operations, including those issued in connection with genuine rename commands. If genuine rename operations were separately processed, the use of flags indicating additional file names can be omitted. For example, the pseudocode set forth below can be invoked after checking whether a file corresponding to a rename command satisfies one or more application save pattern requirements—namely:

1. The rename should be on a file (not on a folder);
2. The rename request should not be a replace-if-exists;
3. Both the source and target should be in the same directory; and
4. The file being renamed must be opened in writeable mode.

This may be required to handle a case when a simple rename is performed. The simple renames performed by MoveFile and MoveFileEx APIs open the file with READ and DELETE access mode. An application opens files in READ and WRITE mode, and still issues renames request by sending a SET_FILE_INFORMATION directly. In those cases, the source files left over after all renames will be deleted due to the DOL TimeOut process, but the new data will still be flushed efficiently, reducing the total number of bytes transferred over the network 50.

In Rename Code Path
Renaming a file A to B, is handled as follows
If the file being renamed satisfies all the conditions required for application save pattern:

```
If (B exists in DOL) {
    Remove B from DOL list
    Add A to the DOL list
    Perform rename operation on locally (on EFG)
    Suppress rename upcall (to cache server)
} else {
    Add B to DOL with current timestamp
    Issue Create Upcall to Cache Server for B
    If (upcall successful) {
        Perform the rename locally
    } else {
        Fail the rename request.
    }
}
The DOL TimeOut Thread
```

This thread scans the DOL list every second.

```
For each entry in DOL {
    If the entry has timed out, issue a delete upcall (to cache server) for this entry.
}
```

Particular embodiments of the above-described process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the process described above and many possible modularizations of those orderings. As a result, the invention is not limited to the specific examples and illustrations discussed above, but only by the following claims and their equivalents.

What is claimed is:

1. An apparatus comprising:
one or more network interfaces;
a memory;
one or more processors;
computer-readable instructions stored in the memory operable to cause the one or more processors to:
  maintain a deletion object list comprising one or more entries each identifying files to be deleted on a remote file server;
  scan the deletion object list and cause the remote file server to delete files corresponding to expired entries;
  receive a command to create a temporary file on the remote file server;
  receive a rename command identifying a source file name and a target file name;
  determine whether the deletion object list includes the target file name of the rename command;
  based at least upon a determination that the deletion object list includes the target file name of the rename command:
    remove the target file name from the deletion object list; and
    add an entry including the source file name to the deletion object list.

2. The apparatus of claim 1, wherein each entry of the deletion object list comprises a file name identifier and a time stamp.

3. The apparatus of claim 1, wherein the command to create is associated with an application-level save operation corresponding to a source file.

4. The apparatus of claim 1, further comprising computer-readable instructions stored in the memory operable to cause the one or more processors to:
create the temporary file on a local edge cache and the remote file server.

5. The apparatus of claim 4, further comprising computer-readable instructions stored in the memory operable to cause the one or more processors to:
synchronize a first instance of a source file with a corresponding second instance of the source file, the first instance stored on the local edge cache and the second instance stored on the remote file server.

6. The apparatus of claim 4, further comprising computer-readable instructions stored in the memory operable to cause the one or more processors to:
perform the rename command on the local edge cache.

7. The apparatus of claim 1, further comprising computer-readable instructions stored in the memory operable to cause the one or more processors to:
based on a determination that the deletion object list does not include the target file name of the rename command:
transmit a command causing creation of a file including the target file name on the remote file server; and
add an entry including the target file name to the deletion object list.

8. A method for operating a network, comprising:
maintaining a deletion object list comprising one or more entries each identifying files to be deleted on a remote file server;
scanning the deletion object list and causing the remote file server to delete files corresponding to expired entries;
receiving a command to create a temporary file on the remote file server;
receiving a rename command identifying a source file name and a target file name;
determining whether the deletion object list includes the target file name of the rename command; and
based at least upon a determination that the deletion object list includes the target file name of the rename command:
removing the target file name from the deletion object list; and
adding an entry including the source file name to the deletion object list.

9. The method of claim 8, further comprising:
creating the temporary file on a local edge cache and the remote file server.

10. The method of claim 9, further comprising:
synchronizing a first instance of a source file with a corresponding second instance of the source file, the first instance stored on the local edge cache and the second instance stored on the remote file server.

11. The method of claim 9, further comprising:
performing the rename command on the local edge cache.

12. The method of claim 8, further comprising:
based on a determination that the deletion object list does not include the target file name of the rename command:
transmitting a command causing creation of a file including the target file name on the remote file server; and
adding an entry including the target file name to the deletion object list.

13. The method of claim 8, wherein each entry of the deletion object list comprises a file name identifier and a time stamp.

14. The method of claim 8, wherein the command to create is associated with an application-level save operation corresponding to a source file.

15. At least one non-transitory computer-readable medium comprising instructions, the instructions configured, when loaded and executed by a processor, to cause the processor to:
maintain a deletion object list comprising one or more entries each identifying files to be deleted on a remote file server;
scan the deletion object list and cause the remote file server to delete files corresponding to expired entries;
receive a command to create a temporary file on the remote file server;
receive a rename command identifying a source file name and a target file name;
determine whether the deletion object list includes the target file name of the rename command; and
based at least upon a determination that the deletion object list includes the target file name of the rename command:
remove the target file name from the deletion object list; and
add an entry including the source file name to the deletion object list.

16. The at least one non-transitory computer-readable medium of claim 15, wherein the instructions are further configured, when loaded and executed by the processor, to:
create the temporary file on a local edge cache and the remote file server.

17. The at least one non-transitory computer-readable medium of claim 16, wherein the instructions are further configured, when loaded and executed by the processor, to:
synchronize a first instance of a source file with a corresponding second instance of the source file, the first instance stored on the local edge cache and the second instance stored on the remote file server.

18. The at least one non-transitory computer-readable medium of claim 16, wherein the instructions are further configured, when loaded and executed by the processor, to:
perform the rename command on the local edge cache.

19. The at least one non-transitory computer-readable medium of claim 15, wherein the instructions are further configured, when loaded and executed by the processor, to:
based on a determination that the deletion object list does not include the target file name of the rename command:
transmit a command causing creation of a file including the target file name on the remote file server; and
add an entry including the target file name to the deletion object list.

20. The at least one non-transitory computer-readable medium of claim 15, wherein each entry of the deletion object list comprises a file name identifier and a time stamp.

21. The at least one non-transitory computer-readable medium of claim 15, wherein the command to create is associated with an application-level save operation corresponding to a source file.

* * * * *